US010510151B2

(12) United States Patent
Sheridan et al.

(10) Patent No.: US 10,510,151 B2
(45) Date of Patent: Dec. 17, 2019

(54) METHOD AND SYSTEM FOR OBTAINING PAIR-WISE EPIPOLAR CONSTRAINTS AND SOLVING FOR PANORAMA POSE ON A MOBILE DEVICE

(71) Applicant: Google Inc., Mountain View, CA (US)

(72) Inventors: Alan Sheridan, Apex, NC (US); Charles Armstrong, San Jose, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/308,265

(22) PCT Filed: Oct. 28, 2016

(86) PCT No.: PCT/US2016/059374
§ 371 (c)(1),
(2) Date: Nov. 1, 2016

(87) PCT Pub. No.: WO2017/192166
PCT Pub. Date: Nov. 9, 2017

(65) Prior Publication Data
US 2019/0051000 A1 Feb. 14, 2019

Related U.S. Application Data

(60) Provisional application No. 62/331,273, filed on May 3, 2016.

(51) Int. Cl.
*G06T 7/33* (2017.01)
*G06T 7/73* (2017.01)
(Continued)

(52) U.S. Cl.
CPC ............ *G06T 7/337* (2017.01); *G06F 3/0488* (2013.01); *G06F 3/04817* (2013.01);
(Continued)

(58) Field of Classification Search
None
See application file for complete search history.

(56) References Cited

U.S. PATENT DOCUMENTS 6,486,908 B1 * 11/2002 Chen .................... G06T 3/0018
345/441
7,929,800 B2 * 4/2011 Meadow .................. G06K 9/32
382/284
(Continued)

OTHER PUBLICATIONS

Tsai, Victor JD, and Chun-Ting Chang. "Three-dimensional positioning from Google street view panoramas." IET Image Processing 7, No. 3 (2013): 229-239. (Year: 2013).*
(Continued)

*Primary Examiner* — Michelle M Entezari
(74) *Attorney, Agent, or Firm* — Lerner, David, Littenberg, Krumholz & Mentlik, LLP

(57) ABSTRACT

Aspects of the disclosure generally relate to determining the location and orientation of panoramic images by a computing apparatus. One or more computing devices may receive alignment data between a first panoramic image and second panoramic image and original location data for the first panoramic image and the second panoramic image. The one or more computing devices may determine relative orientations between the pair of panoramic images based on the alignment data and calculate a heading from the first panoramic image to the second panoramic image based on the original location data. The location data and alignment data may be optimized by the one or more computing devices based on the relative orientations between the pair of panoramic images and the original location data. The one or more computing devices may replace the original location data and relative orientations with the optimized relative orientations and optimized location data.

20 Claims, 16 Drawing Sheets

(51) Int. Cl.
G06T 3/40 (2006.01)
G06F 3/0488 (2013.01)
G06F 3/0484 (2013.01)
G06F 3/0481 (2013.01)

(52) U.S. Cl.
CPC ........ G06F 3/04845 (2013.01); G06T 3/4038 (2013.01); G06T 7/74 (2017.01); *G06T 2200/32* (2013.01); *G06T 2207/20101* (2013.01)

(56) References Cited

U.S. PATENT DOCUMENTS

| | | | |
|---|---|---|---|
| 8,787,700 | B1 | 7/2014 | Aly et al. |
| 8,798,451 | B1* | 8/2014 | Kweon ................ G03B 37/06 348/36 |
| 9,244,940 | B1 | 1/2016 | Donsbach et al. |
| 9,589,354 | B2* | 3/2017 | Wells .................... G06F 3/017 |
| 2004/0004659 | A1* | 1/2004 | Foote .................... H04N 5/262 348/36 |
| 2006/0132482 | A1 | 6/2006 | Oh |
| 2008/0291217 | A1 | 11/2008 | Vincent et al. |
| 2012/0300020 | A1* | 11/2012 | Arth ........................ G06T 7/75 348/36 |
| 2014/0362174 | A1* | 12/2014 | Fan ........................ G06T 17/05 348/36 |
| 2015/0062292 | A1* | 3/2015 | Kweon ............. H04N 5/23238 348/37 |
| 2015/0269785 | A1 | 9/2015 | Bell et al. |

OTHER PUBLICATIONS

Wang, Chun-Po, Kyle Wilson, and Noah Snavely. "Accurate georegistration of point clouds using geographic data." In 2013 International Conference on 3D Vision-3DV 2013, pp. 33-40. IEEE, 2013. (Year: 2013).*

Bansal, Mayank, Harpreet S. Sawhney, Hui Cheng, and Kostas Daniilidis. "Geo-localization of street views with aerial image databases." In Proceedings of the 19th ACM international conference on Multimedia, pp. 1125-1128. ACM, 2011. (Year: 2011).*

Adel, Ebtsam, Mohammed Elmogy, and Hazem Elbakry. "Image stitching based on feature extraction techniques: a survey." International Journal of Computer Applications 99.6 (2014): 1-8. (Year: 2014).*

Wagner, D., Mulloni, A., Langlotz, T., & Schmalstieg, D. (Mar. 2010). Real-time panoramic mapping and tracking on mobile phones. In 2010 IEEE virtual reality conference (VR) (pp. 211-218). IEEE. (Year: 2010).*

International Preliminary Report on Patentability for PCT Application No. PCT/US2016/059109, dated Nov. 15, 2018. 9 pages.

International Preliminary Report on Patentability for PCT Application No. PCT/US2016/059374, dated Nov. 15, 2018. 10 pages.

MOHAMED Aly et al: "Street view goes indoors: Automatic pose estimation from uncalibrated unordered spherical panoramas," Applications of Computer Vision (WACV) , 2012 IEEE Workshop on, IEEE, Jan. 9, 2012 (Jan. 9, 2012), pp. 1-8, XP032126189, DOI: 10.1109/WACV.2012.6162996, ISBN: 978-1-4673-8233-3.

Laganiere R et al: "Orientation and Pose estimation for Panoramic Imagery," Machine Graphics and Vision, Institute of Computer Science, Warzaw, PL, vol. 19, No. 3, Jan. 2010 (Jan. 2010), pp. 339-363, XP009169146, ISSN: 1230-0535.

Pin-Yun Chen et al: "Matching and Relative Orientation of Spherical Panorama Images," Jan. 2016 (Jan. 2016), XP055339694, Retrieved from the Internet: <http://www.a-a-r-s.org/acrs/administrator/components/com_jresearch/files/publications/Ab_0216.pdf>.

Aparna Taneja et al: "Registration of Spherical Panoramic Images with Cadastral 3D Models," 3D Imaging, Modeling, Processing, Visualization and Transmission (3DIMPVT), 2012 Second International Conference on, IEEE, Oct. 13, 2012 (Oct. 13, 2012), pp. 479-486, XP032277311, DOI: 10.1109/3DIMPVT.2012.45, ISBN: 978-1-4673-4478-8.

Damien Michel et al: "Localizing Unordered Panoramic Images Using the Levenshtein Distance," Computer Vision, 2007. ICCV 2007. IEEE 11th International Conference on, Jan. 2007 (Jan. 2007), pp. 1-7, XP055339683, Pi DOI: 10.1109/1CCV.2007.4409200, ISBN: 978-1-4244-1630-1.

International Search Report and Written Opinion for PCT Application No. PCT/US2016/059374, dated Feb. 15, 2017.

International Search Report and Written Opinion for PCT Application No. PCT/US2016/059109, dated Feb. 17, 2017.

Michel, et al. Localizing Unordered Panoramic Images Using the Levenshtein Distance, Jan. 2007, pp. 1-7, Institute of Computer Science Foundation for Research and Technology.

\* cited by examiner

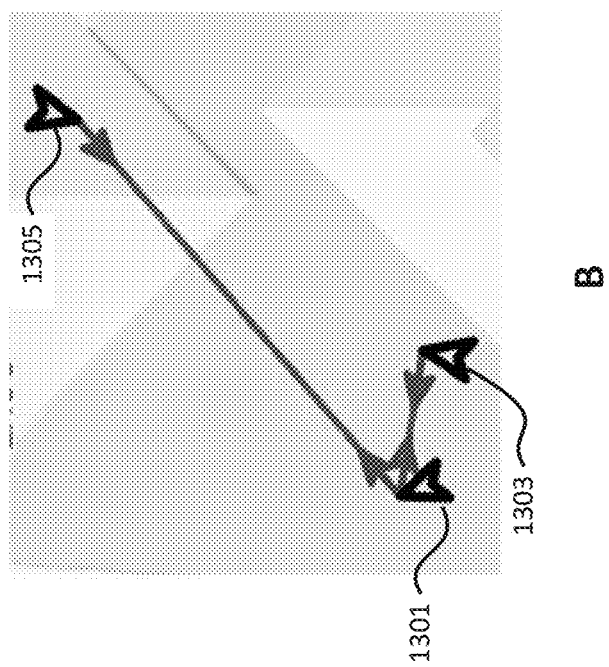
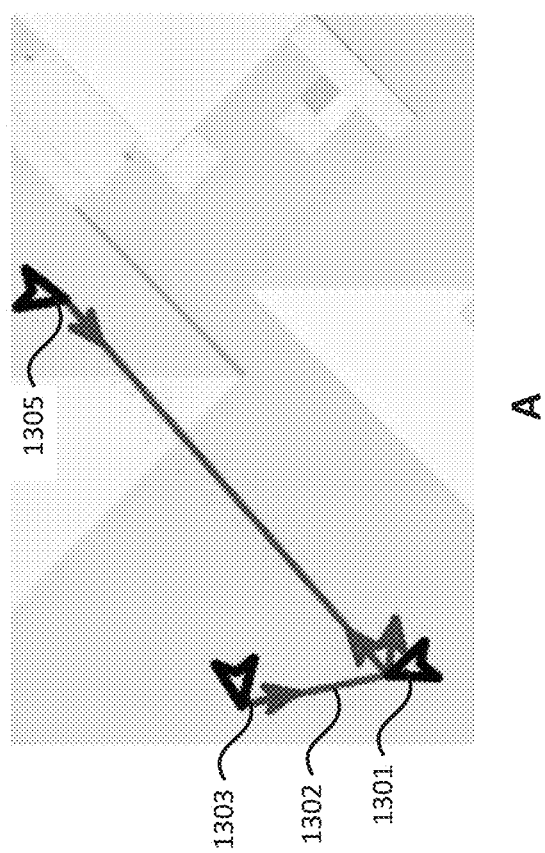
FIGURE 13

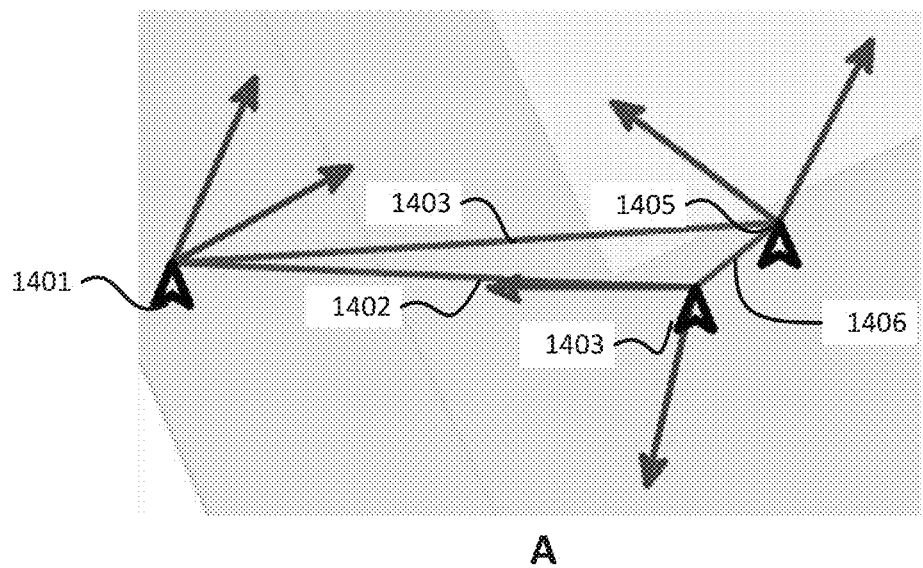
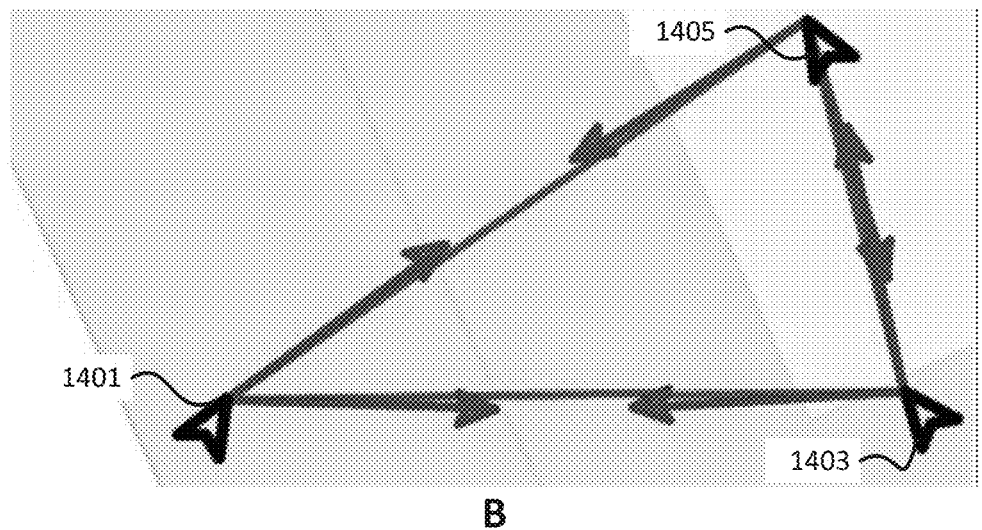
FIGURE 14

METHOD AND SYSTEM FOR OBTAINING PAIR-WISE EPIPOLAR CONSTRAINTS AND SOLVING FOR PANORAMA POSE ON A MOBILE DEVICE

CROSS REFERENCE TO RELATED APPLICATIONS

The present application is a national phase entry under 35 U.S.C. § 371 of International Application No. PCT/US2016/059374 filed Oct. 28, 2016, which claims priority from U.S. Provisional Application No. 62/331,273 filed May 3, 2016, the disclosures of which are incorporated by reference herein.

BACKGROUND

Access to computing devices, such as mobile devices and digital cameras, has led to a proliferation of digital images, including panoramic images. Panoramic images may be connected (e.g., linked) to each other based on their location and orientation data. The locations at which the panoramic images were captured are typically derived from the global position systems ("GPS") on the computing devices which captured the images. However, these systems are often inaccurate, and can provide location data which is off by a significant distance, e.g., a few meters or more. Panoramic images may thus be improperly connected together based on the inaccurate data.

When transitioning between connected neighboring panoramic images, the orientations of the two images may be different; this may result in the user being presented with a jarring and confusing experience as they transition between panoramic images. While automatic computer vision based techniques can be used to orient panoramic images relative to each other based on visually similar image data, this can consume significant amounts of processing resources and the results are very often of low quality.

SUMMARY

Various embodiments within the disclosure relate generally to connecting panoramic images with accurate orientation information such that there is a consistent, natural transition when a user switches from viewing one panoramic image to viewing another panoramic image captured from a nearby location.

An aspect includes a method for determining the location and orientation of panoramic images. In this regard, a computing apparatus may receive alignment data between a first panoramic image and second panoramic image and original location data for the first panoramic image and the second panoramic image and determine relative orientations between the pair of panoramic images based on the alignment data. The computing apparatus may calculate a heading from the first panoramic image to the second panoramic image based on the original location data, optimize the location data and alignment data based on the relative orientations between the pair of panoramic images and the original location data, and store the original location data and relative orientations with the optimized relative orientations and optimized location data.

In some embodiments, the computing apparatus performs receiving the alignment data from a user.

In some embodiments, the relative orientations between the pair of panoramic images include the direction along which the first panoramic image reaches the second panoramic image and the direction along which the second panoramic image reaches the first panoramic image.

In some embodiments, the computing apparatus performs calculating the heading is $\theta$ as $\theta = a\tan 2\,(\sin\Delta\lambda\cdot\cos\varphi_2,\,\cos\varphi_1\cdot\sin\varphi_2 - \sin\varphi_1\cdot\cos\varphi_2\cdot\cos\Delta\lambda)$, where $\varphi_1,\lambda_1$ is the latitude and longitude, respectively, of the first panoramic image and, $\varphi_2,\lambda_2$ is the latitude and longitude of the corresponding panoramic image, and $\Delta\lambda$ is the difference in longitude between the first panoramic image and the corresponding panoramic image.

In some embodiments, the computing apparatus may perform the optimization by calculating optimized values while minimizing the costs to one or more objective functions.

In some embodiments, the computing apparatus may perform minimizing the costs to the one or more objective functions are minimized by solving for the minimum value using a least squares solver.

In some embodiments, the computing apparatus may perform minimizing the objective functions by minimizing the distance of the optimized locations for the first and second panoramic images from the original locations and assuring the optimized relative orientations are 180 degrees apart.

Another aspect includes an apparatus for determining the location and orientation of panoramic images. In this regard the apparatus may be configured to receive alignment data between a first panoramic image and second panoramic image and original location data for the first panoramic image and the second panoramic image and determine relative orientations between the pair of panoramic images based on the alignment data. The apparatus may calculate a heading from the first panoramic image to the second panoramic image based on the original location data, optimize the location data and alignment data based on the relative orientations between the pair of panoramic images and the original location data, and store the optimized relative orientations and optimized location data as relative orientation data and location data for the first and second panoramic images.

Another aspect includes a computer program comprising machine readable instructions that when executed by the computing apparatus control it to perform the method of determining the location and orientation of panoramic images.

Another aspect includes a method for determining the location and orientation of panoramic images. In this regard, one or more computing devices may receive alignment data between a first panoramic image and second panoramic image and original location data for the first panoramic image and the second panoramic image and determine relative orientations between the pair of panoramic images based on the alignment data. The one or more computing devices may calculate a heading from the first panoramic image to the second panoramic image based on the original location data, optimize the location data and alignment data based on the relative orientations between the pair of panoramic images and the original location data, and replace the original location data and relative orientations with the optimized relative orientations and optimized location data.

In some embodiments, the alignment data is received from a user.

In some embodiments, the relative orientations between the pair of panoramic images include the direction along which the first panoramic image reaches the second panoramic image and the direction along which the second panoramic image reaches the first panoramic image.

In some embodiments, the heading is calculated by $\theta = a\tan 2 (\sin \Delta\lambda \cdot \cos \varphi_2, \cos \varphi_1 \cdot \sin \varphi_2 - \sin \varphi_1 \cdot \cos \varphi_2 \cdot \cos \Delta\lambda)$, where $\varphi_1, \lambda_1$ is the latitude and longitude, respectively, of the first panoramic image and, $\varphi_2, \lambda_2$ is the latitude and longitude of the corresponding panoramic image, and $\Delta\lambda$ is the difference in longitude between the first panoramic image and the corresponding panoramic image.

In some embodiments, the optimization includes calculating optimized values while minimizing the costs to one or more objective functions.

In some embodiments, the costs to the one or more objective functions are minimized by solving for the minimum value using a least squares solver.

In some embodiments, the objective functions include minimizing the distance of the optimized locations for the first and second panoramic images from the original locations and assuring the optimized relative orientations are 180 degrees apart.

Another aspect includes a system for dispatching entered data. The system may comprise one or more computing devices having one or more processors and memory storing instructions. The instructions may be executable by the one or more processors and may comprise receiving alignment data between a first panoramic image and second panoramic image and original location data for the first panoramic image and the second panoramic image and determining relative orientations between the pair of panoramic images based on the alignment data. The instructions may further comprise calculating a heading from the first panoramic image to the second panoramic image based on the original location data, optimizing the location data and alignment data based on the relative orientations between the pair of panoramic images and the original location data, and replacing the original location data and relative orientations with the optimized relative orientations and optimized location data.

Another aspect includes non-transitory computer-readable medium storing instructions. The instructions, which when executed by one or more processors, cause the one or more processors to receive alignment data between a first panoramic image and second panoramic image and original location data for the first panoramic image and the second panoramic image and determine relative orientations between the pair of panoramic images based on the alignment data. The instructions may further cause the one or more processors to calculate a heading from the first panoramic image to the second panoramic image based on the original location data, optimize the location data and alignment data based on the relative orientations between the pair of panoramic images and the original location data, and replace the original location data and relative orientations with the optimized relative orientations and optimized location data.

BRIEF DESCRIPTION OF THE DRAWINGS

The present technology is illustrated by way of example, and not by way of limitation, in the figures of the accompanying drawings in which like reference numerals refer to similar elements including:

FIGS. 12*a*-14*a* are example illustrations of three connected panoramic images in accordance with aspects of the disclosure.

FIGS. 12*b*-14*b* are example illustration of three optimized connected panoramic images in accordance with aspects of the disclosure.

DETAILED DESCRIPTION

Overview

The technology relates to connecting panoramic images with accurate orientation information such that there is a consistent, natural transition when a user switches from viewing one panoramic image to viewing another panoramic image captured from a nearby location. At least some aspects of the technology include a user interface that enables panoramic images to be connected with accurate orientation information by soliciting certain information from users in a way that makes it easy for the users to provide the solicited information. Other aspects of the technology relate to automatic optimization to provide for correction of inaccuracies (resulting from human error or inaccuracy of technical measurement) in locations of the panoramic images, their relative orientations, and the heading between two panoramic images. Although the technology is described in terms of panoramic images, other images, such as images with less than a 180-degree field of view may also be used.

For instance, a user may cause a computing device to load a first panoramic image captured at a first location. The user may then select an area within the first panoramic image where they would like to create a connection to a second panoramic image captured at a second location. The computing device may load the second panoramic image and the user may align the second panoramic image relative to the orientation of the first panoramic image, such that both images are oriented in the same direction.

Based on the relative orientations of the images, the computing device may optimize the location and orientations of the first and second panoramic images and create a connection between the two images. Accordingly, when a user causes the computing device to switch from viewing the first panoramic image to viewing the connected second panoramic image, the transition may be consistent, smooth and natural.

Figure 3:
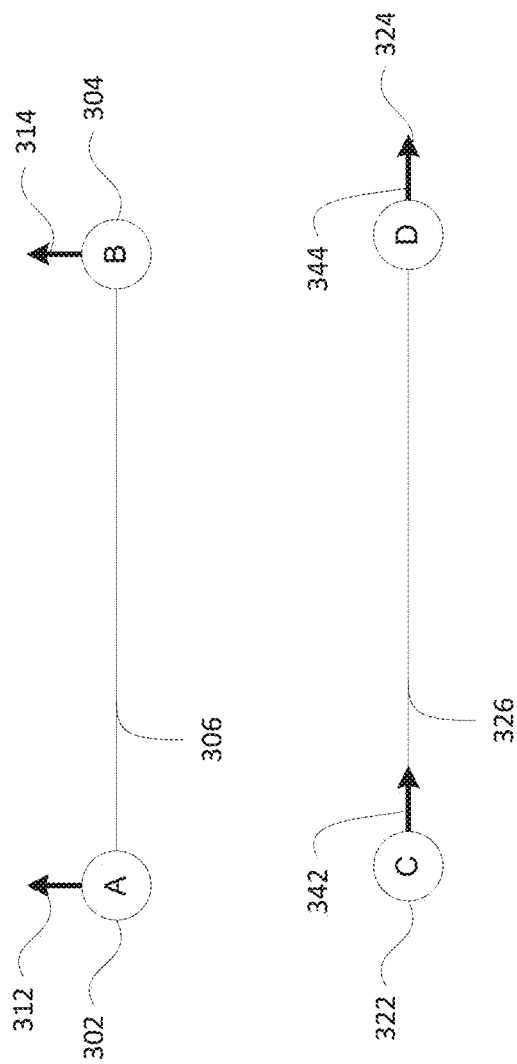
FIG. 3 is an example of consistent transitions in accordance with aspects of the disclosure.

A consistent transition may include a transition from viewing a first panoramic image to a second panoramic image where the direction of motion is consistent (e.g., with little to no rotation). For example, FIG. 3 shows an example of two different types of transitions without rotation. Panoramic images A and B are represented by circles 302 and 304, respectively. Line 306 extends from the location at which panoramic image A was captured to the location at which panoramic image B was captured. Panoramic image A is shown with an arrow 312 indicating an orientation at which panoramic image A is displayed to a user relative to the circle 302. If the orientation of the view of the panoramic images remains constant, a transition from panoramic image A to panoramic image B would appear as if the user were moving sideways along line 306. The actual transition may be displayed using any type of still image transitioning effect such as the panning and zooming of the Ken Burns Effect. Panoramic image B is shown with an arrow 314 indicating an orientation at which panoramic image B is displayed to a user relative to the circle 304 after the transition. Thus, the relative orientation between the images does not change, and there is no rotation as part of the transition.

Similarly, in the second example, panoramic images C and D are represented by circles 322 and 324, respectively. Line 326 extends from the location at which panoramic image C was captured to the location at which panoramic image D was captured. Panoramic image 322 is shown with an arrow 324 indicating an orientation at which panoramic image C is displayed to a user relative to the circle 322. If the orientation of the view of the panoramic images remains constant, a transition from panoramic image C to panoramic image D would appear as if the user were moving straight ahead along line 326. In this regard, panoramic image D is shown with an arrow 324 indicating an orientation at which panoramic image D is displayed to a user relative to the circle 322 after the transition. Thus, again, the relative orientation between the images does not change, and there is no rotation as part of the transition.

The computing device may create a connection between a first panoramic image and another panoramic image. In this regard, the user may select an area on the first panoramic image to indicate that the selected area should be used to create a connection point with another panoramic image.

Once a connection point has been selected, a corresponding panoramic image may be selected to pair with the first panoramic image. In this regard, the computing device may display the closest captured panoramic images as options for the corresponding panoramic image. One of the options may be selected by the user as a corresponding panoramic image.

The orientations of the two panoramic images (i.e., the first panoramic image and the corresponding panoramic image) may be aligned. In this regard the computing device may display the first panoramic image and the corresponding panoramic image simultaneously. Since the orientations of the first panoramic image and the corresponding panoramic image are likely unknown or incorrect, the view of the panoramic images may be different. As such, the computing device may display an alignment line to assist the user in aligning the direction of the corresponding panoramic image to the first panoramic image.

Based on the location data and relative orientations of the two panoramic images, the computing device may determine the direction of common vectors between the two panoramic images. The relative orientation between the two panoramic images may then be calculated as an angular distance from the common vector. Similarly, the angular difference between the relative orientation of the corresponding panoramic image may be calculated from the same vector.

Additionally, the heading from the first panoramic image to the corresponding image may be determined. In this regard, using the location data (i.e., latitude and longitude data) of the first panoramic image and corresponding image, the heading between the first panoramic image and the corresponding panoramic image may be calculated. Upon determining the orientation and location data, the connection between the first panoramic image and the corresponding panoramic image may be completed.

In the event other panoramic pairs have been created with one or both of the first panoramic image or corresponding panoramic image, the locations of all of the panoramic images in the panoramic pairs, as well as their relative orientations and headings may be optimized. Since the location data and relative orientations of the two panoramic images may be inaccurate, such as from human error or imprecise GPS data the transition from the first panoramic image to the corresponding panoramic image may still be inconsistent, and such inconsistencies may be compounded as additional panoramic images are paired with one or more of the two panoramic images. As such, the computing device may calculate modifications to those values in accordance with certain objectives.

One of the optimization objectives may be to determine new locations for the panoramic images that are as close as possible to the original GPS locations. Another objective may be that the orientations of the panoramic images are such that the directions defined by relative angles between pairs of panoramic images point towards each other. Yet another objective may be that the distances between pairs of panoramic images are as close to the original distances as possible. New location and orientations for both panoramic images may be determined by minimizing the costs of an objective function and solving for a minimum value using a least-squares solver. The total cost may be a weighted sum of all the GPS costs, all of the orientation costs, and all of the distance costs. In some aspects, a panoramic image may have many corresponding panoramic images. As such, the above objectives may be satisfied by minimizing the costs to the above objective functions for each panoramic image pair.

The features described herein may allow a user to connect panoramas in such a way as to enable intuitive and consistent panorama transitions. In that regard, untrained individuals may connect panoramic images to each other using a relatively simple and intuitive solution that can be implemented on a mobile device. Aspects of the technology also allow for the connection of panoramic images that don't have a lot of data image overlap and without the need for need for computer vision.

Example Systems

Figure 1:
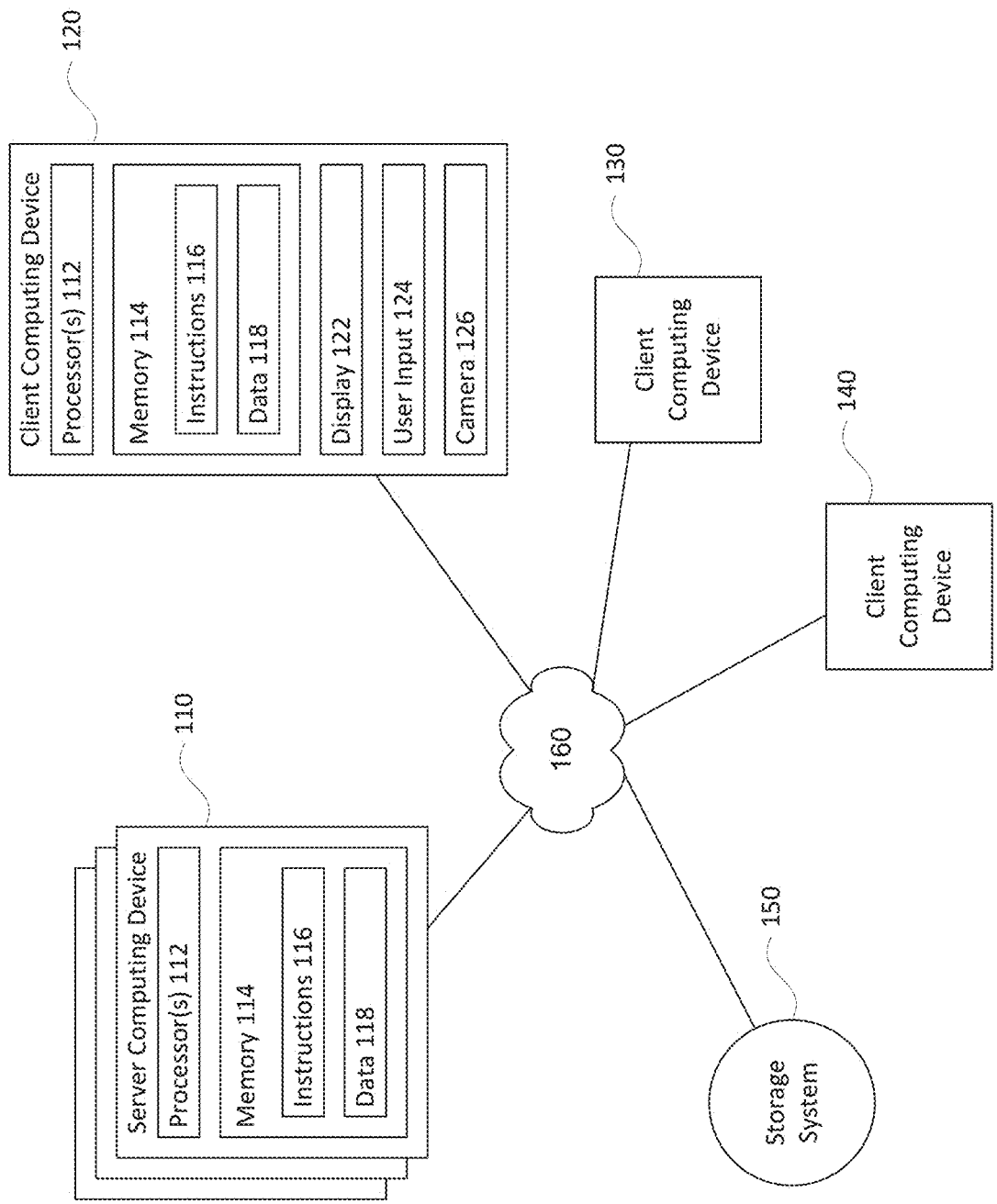
FIG. 1 is a functional diagram of an example system in accordance with aspects of the disclosure.
Figure 2:
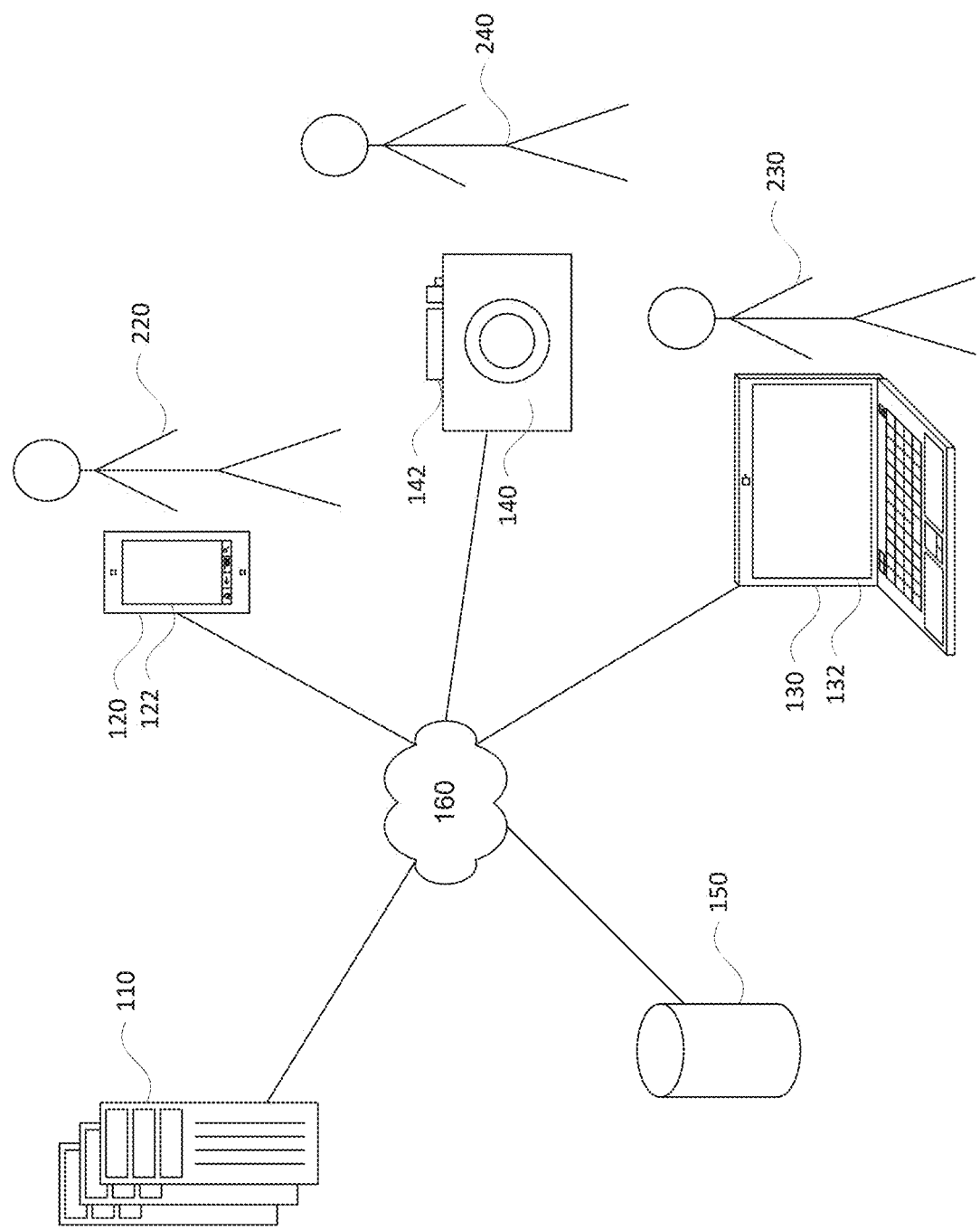
FIG. 2 is a pictorial diagram of the example system of FIG. 1.

FIGS. 1 and 2 show an example system 100 in which the features described herein may be implemented. It should not be considered as limiting the scope of the disclosure or usefulness of the features described herein. In this example, system 100 may include computing devices 110, 120, 130, and 140 as well as storage system 150. Each computing device may contain one or more processors 112, memory 114 and other components typically present in general purpose computing devices. Memory 114 of each of computing devices 110, 120, 130, and 140 may store information accessible by the one or more processors 112, including instructions 116 that can be executed by the one or more processors 112.

The memory may store data that can be retrieved, manipulated or stored by one or more processors. The memory may be of any non-transitory type capable of storing information accessible by the processor, such as a hard-drive, memory card, ROM, RAM, DVD, CD-ROM, write-capable, and read-only memories.

The instructions 116 may be any set of instructions to be executed directly, such as machine code, or indirectly, such as scripts, by the one or more processors. In that regard, the terms "instructions," "application," "steps," and "programs" can be used interchangeably herein. The instructions can be stored in object code format for direct processing by a processor, or in any other computing device language including scripts or collections of independent source code modules that are interpreted on demand or compiled in advance. Functions, methods, and routines of the instructions are explained in more detail below.

Data 118 may be retrieved, stored, and modified by the one or more processors 112 in accordance with the instructions 116. For instance, although the subject matter described herein is not limited by any particular data structure, the data can be stored in computer registers, in a relational database as a table having many different fields and records, or XML documents. The data can also be formatted in any computing device-readable format such as, but not limited to, binary values, ASCII or Unicode. Moreover, the data can comprise any information sufficient to identify the relevant information, such as numbers, descriptive text, proprietary codes, pointers, references to data stored in other memories such as at other network locations, or information that is used by a function to calculate the relevant data.

The one or more processors 112 can be any conventional processors, such as a commercially available CPU. Alternatively, the processors can be dedicated components such as an application specific integrated circuit ("ASIC") or other hardware-based processor. Although not necessary, one or more of computing devices 110, 120, and 130 may include specialized hardware components to perform specific computing processes, such as decoding video, matching video frames with images, distorting videos, encoding distorted videos, etc. faster or more efficiently.

Although FIG. 1 functionally illustrates the processor, memory, and other elements of the computing devices as being within the same block, the processor, computer, computing device, or memory can actually comprise multiple processors, computers, computing devices, or memories that may or may not be stored within the same physical housing. For example, the memory 144 can be a hard drive or other storage media located in housings different from that of the computing device 110.

References to a processor, computer, computing device, or memory will be understood to include references to a collection of processors, computers, computing devices, or memories that may or may not operate in parallel. For example, the computing device 110 may include server computing devices operating as a load-balanced server farm, distributed system, etc. Yet further, although some functions described below are indicated as taking place on a single computing device having a single processor, various aspects of the subject matter described herein can be implemented by a plurality of computing devices, for example, communicating information over network 160.

Each of the computing devices can be at different nodes of a network 160 and capable of directly and indirectly communicating with other nodes of network 160. Although only a few computing devices 110, 120, 130, and 140 are depicted in FIGS. 1-2, it should be appreciated that a typical system can include a large number of connected computing devices, with each different computing device being at a different node of the network 160. The network 160 and intervening nodes described herein can be interconnected using various protocols and systems, such that the network can be part of the Internet, World Wide Web, specific intranets, wide area networks, or local networks. The network can utilize standard communications protocols, such as Ethernet, WiFi and HTTP, protocols that are proprietary to one or more companies, and various combinations of the foregoing. Although certain advantages are obtained when information is transmitted or received as noted above, other aspects of the subject matter described herein are not limited to any particular manner of transmission of information.

As an example, each of the computing devices 110 may include web servers capable of communicating with storage system 150 as well as computing devices 120, 130, and 140 via the network. For example, one or more of server computing devices 110 may use network 160 to transmit and present information to a user, such as user 220 or 230, on a display, such as displays 122 or 132 of computing devices 120 or 130. In this regard, computing devices 120, 130, and 140 may be considered client computing devices, and may perform all or some of the features described herein.

Each of the client computing devices 120, 130, and 140 may be configured similarly to the server computing devices 110, with one or more processors, memory and instructions as described above. Each client computing device 120 or 130 may be a personal computing device intended for use by a user 220 or 230, and have all of the components normally used in connection with a personal computing device such as a central processing unit (CPU), memory (e.g., RAM and internal hard drives) storing data and instructions, a display such as displays 122 or 132 (e.g., a monitor having a screen, a touch-screen, a projector, a television, or other device that is operable to display information), and user input device 124 (e.g., a mouse, keyboard, touch-screen, or microphone). In another example, client computing devices 120-140 may be a head-mounted computing system and/or a virtual reality system. In this regard, an augmented or virtual environment including one or more panoramic images may be presented to a user through a display of the client computing device. The client computing device may also include a camera for recording video streams and/or capturing images, speakers, a network interface device, and all of the components used for connecting these elements to one another.

Although the client computing devices 120, 130, and 140 may each comprise a full-sized personal computing device, they may alternatively comprise mobile computing devices capable of exchanging data with a server, such as server computing device 110, over a network such as the Internet. By way of example only, client computing device 120 may be a mobile phone or a device such as a wireless-enabled PDA, a tablet PC, or a netbook that is capable of obtaining information via the Internet. In another example, client computing device 130 may be a tablet or laptop computer. In an additional example, client computing device 140 may be a digital camera, such as a 360-degree camera or digital single-lens reflex camera. As an example the user may input information using a small keyboard, a keypad, microphone, using visual signals with a camera, or a touch screen.

As with memory 114, storage system 150 can be of any type of computerized storage capable of storing information accessible by the server computing devices 110, such as a hard-drive, memory card, ROM, RAM, DVD, CD-ROM, write-capable, and read-only memories. In addition, storage system 150 may include a distributed storage system where data is stored on a plurality of different storage devices which may be physically located at the same or different geographic locations. Storage system 150 may be connected to the computing devices via the network 160 as shown in FIG. 1 and/or may be directly connected to any of the computing devices 110, 120, 130, and 140 (not shown).

Memory 114 and storage system 150 may store various images, such as panoramic images including a single image or a collection of images as described above having a field of view which is greater than that of the human eye, e.g., 180 degrees or greater. The example panoramic images described herein provide a 360-degree view of a location, such as cylindrical and spherical panoramic images, though other types of images, such as those having a view of less than 360 degrees as well as combinations of images with different viewing angles, may also be used. In addition, each panoramic image may be associated with an image identifier that may be used to retrieve the panoramic image, geographic location information indicating the location and orientation at which the panoramic image was captured (e.g., a latitude longitude pair as well as an indication of which portion of the panoramic image faces a given direction such as North), as well as timestamp information indicating the date and time at which the panoramic image was captured.

Example Methods

Figure 4:
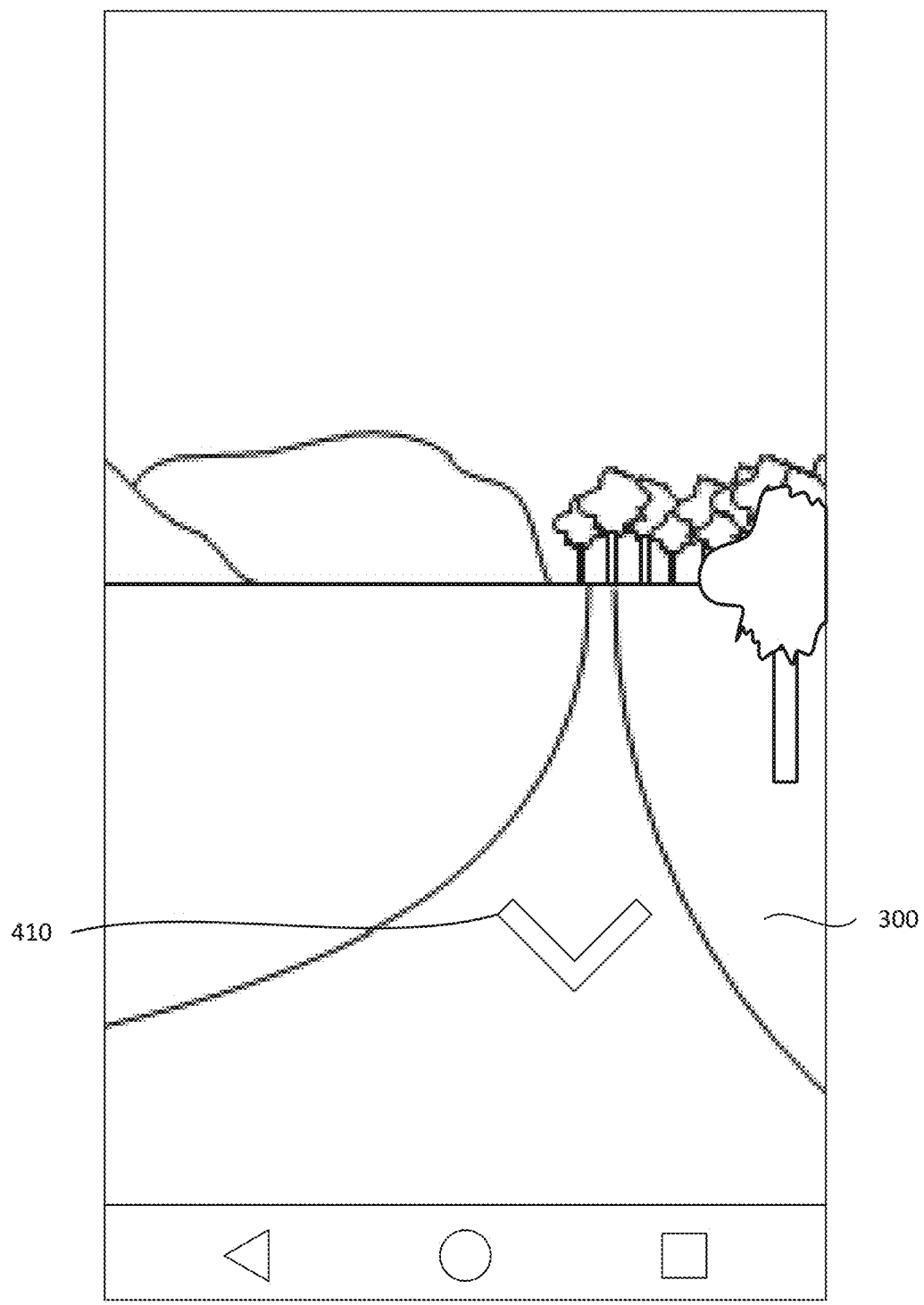
FIG. 4 is an example screenshot of a panoramic image displayed on a user device in accordance with aspects of the disclosure.

In order to connect panoramic images together such that there is a consistent transition between the panoramic images, a computing device may receive a selection of panoramic images to connect. In this regard, a first panoramic image may be displayed within an application on the computing device. For example and as shown in FIG. 4, a first panoramic image 300 may be displayed on a display of a computing device, such as display 122 of computing device 120. The user may view the image from different directions by using the device's user interface to rotate the image. The user may also use the interface to zoom in and out of portions of the panoramic image. In some aspects, the first panoramic image 300 may be connected to additional panoramic image and navigation icons. For instance, navigation icon 410 may indicate that a transition to at least one other panoramic image is available.

Figure 5:
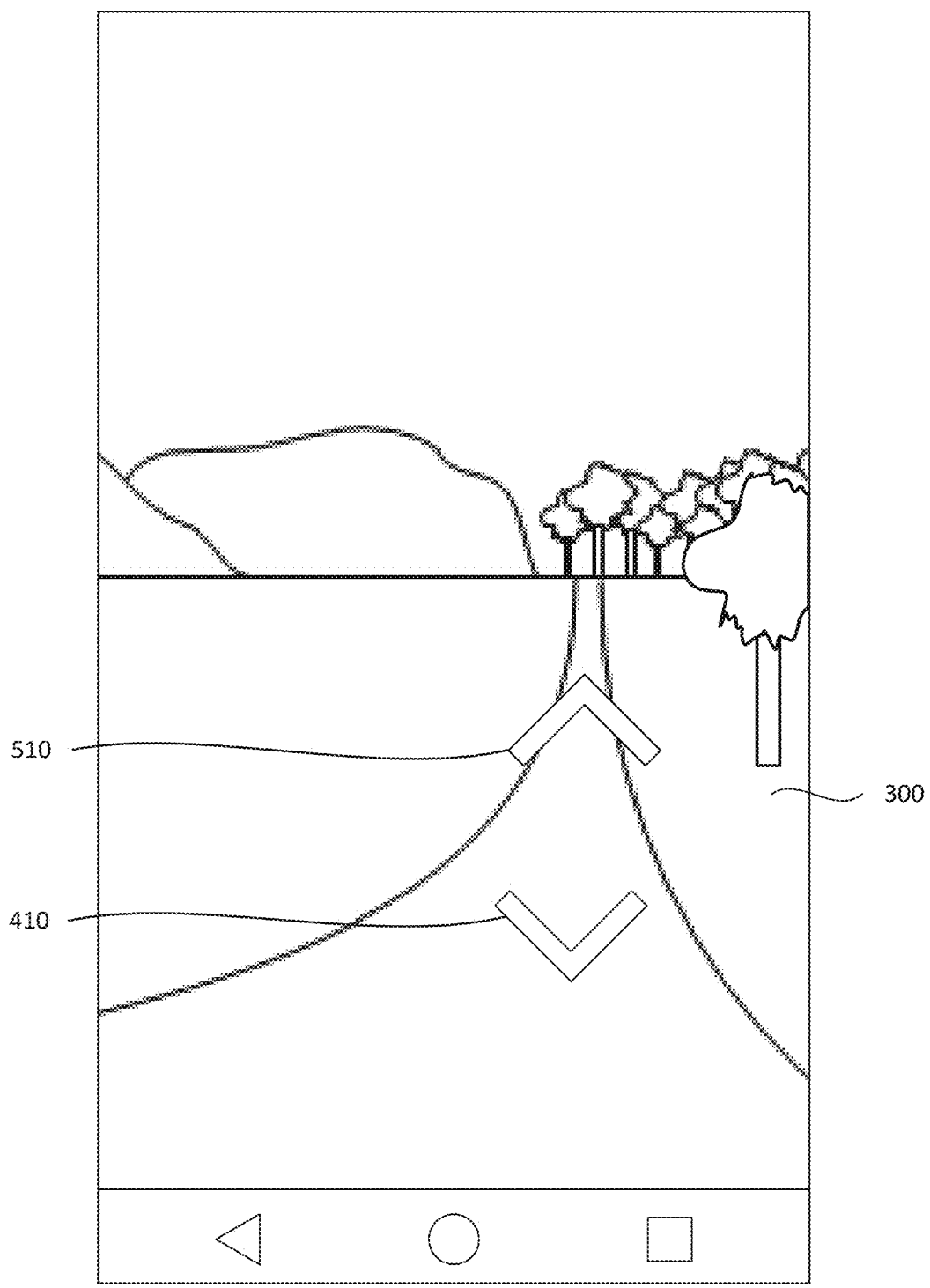
FIG. 5 is an example screenshot of a selected area of a panoramic image displayed on a user device in accordance with aspects of the disclosure.

The computing device may be used to create a connection between the first panoramic image and another panoramic image. In this regard, the user may select an area on the displayed first panoramic image to indicate that the selected area should be used to create a connection point with another panoramic image. For example, as shown in FIG. 5, the user may select area 510 as a connection point. Such a selection may be made by, for example, the user long pressing or double tapping on the area 510 with their finger or a virtual pointer.

Figure 6:
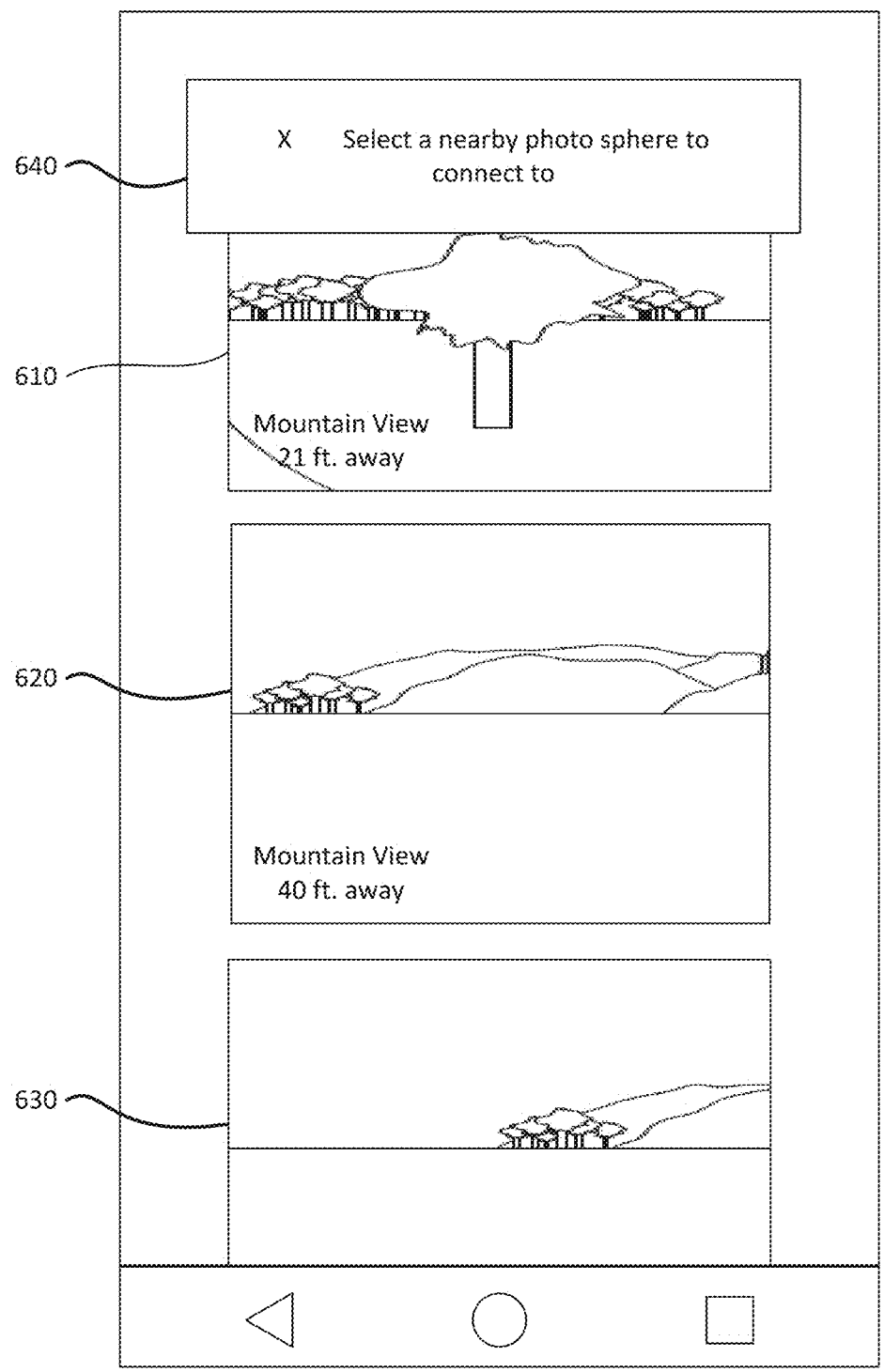
FIG. 6 is an example panoramic image selection interface in accordance with aspects of the disclosure.
Figure 7:
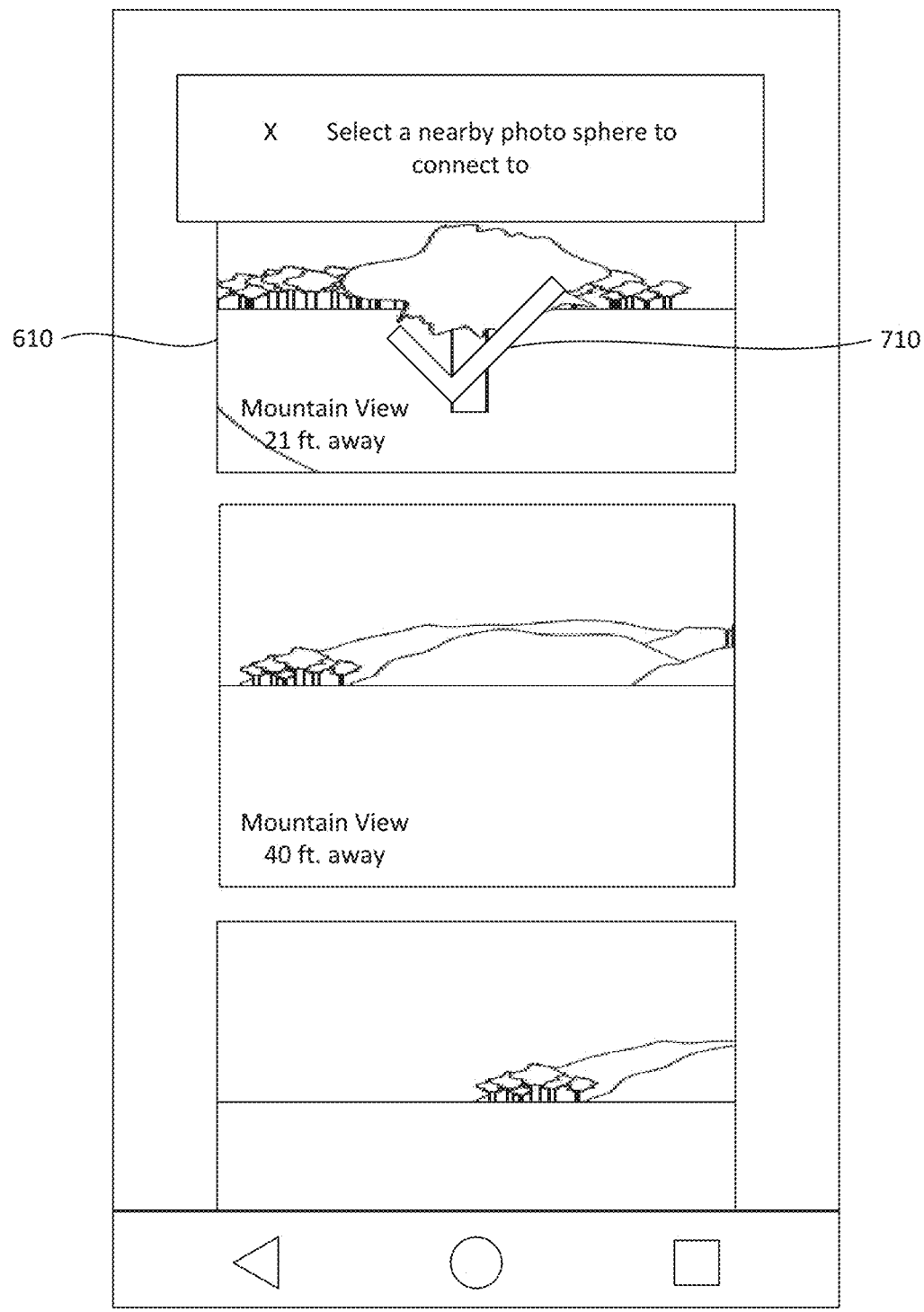
FIG. 7 is an example panoramic image selection interface displaying an image selection confirmation in accordance with aspects of the disclosure.

Once a connection point has been selected, a corresponding panoramic image may be selected to pair with the first panoramic image. In this regard, the computing device may determine, based on the location data associated with the panoramic images stored within its memory or in a storage database, such as database 150, which panoramic images were captured closest to the connection point. The closest captured panoramic images may then be displayed. For example, as shown in FIG. 6, the three closest panoramic images 610-630 to the displayed panoramic image 300 may be displayed to the user, along with the instruction 640 to "select a nearby photosphere to connect to." In some embodiments, additional panoramic images may be presented to the user if the closest captured panoramic images 610-630 are not satisfactory. Upon the user selecting one of the additional panoramic images as the corresponding panoramic image, a confirmation may be displayed. For example, as shown in FIG. 7, a confirmation 710 including a checkmark is displayed when panoramic image 610 is selected as the corresponding panoramic image.

In some aspects, the system may provide a recommended connection point based on the location data of one or more panoramic images located closely to the displayed panoramic image. For example, a processor may identify a second panoramic image that is located within a threshold distance of the location of the displayed image. Such recommended connection points may be generated automatically or upon receiving a request from the user.

Figure 8:
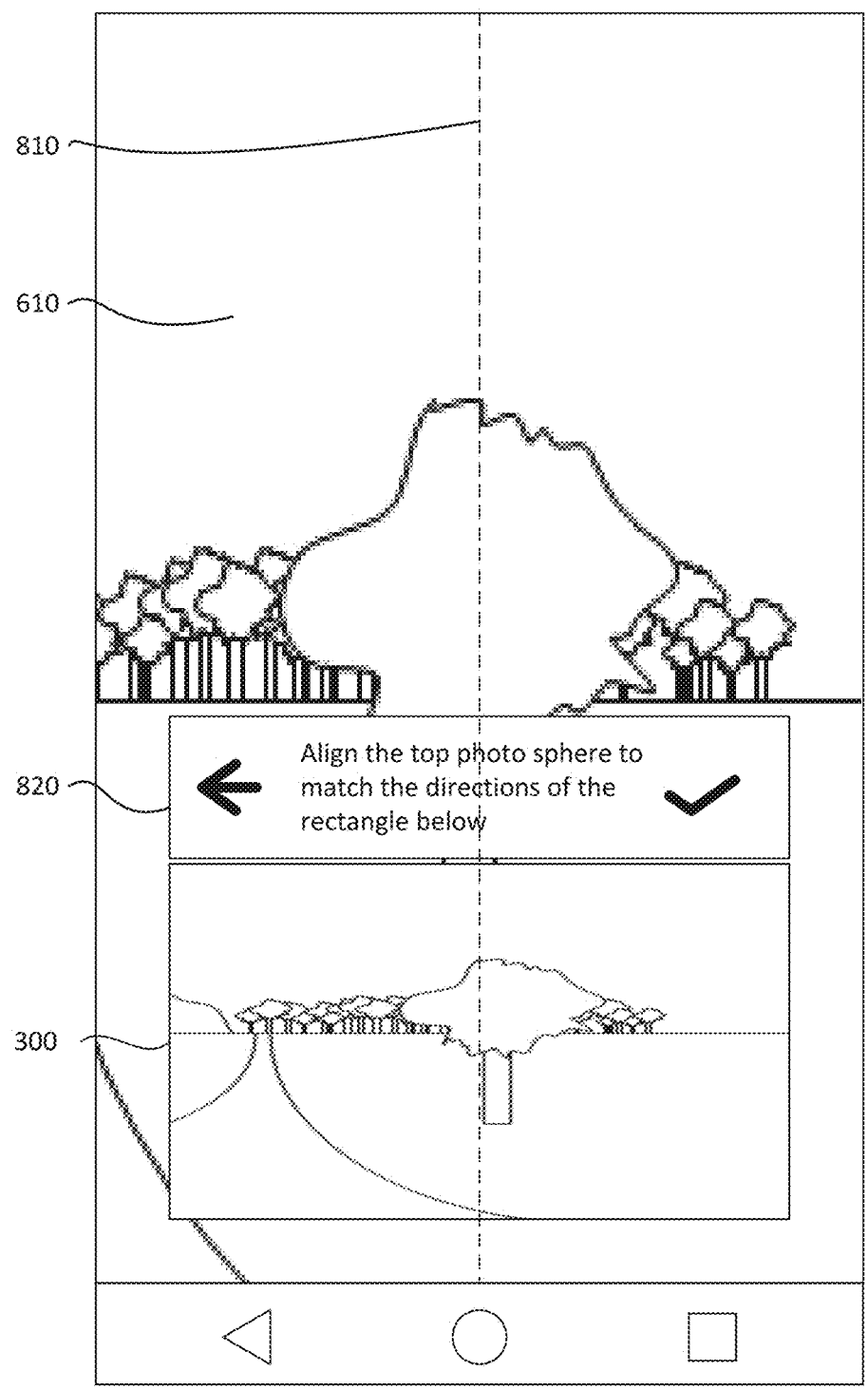
FIG. 8 is an example screenshot of an alignment interface in accordance with aspects of the disclosure.

The orientations of the two panoramic images (i.e., the first panoramic image and the corresponding panoramic image) may be aligned. In this regard, the computing device may display the first panoramic image and the corresponding panoramic image simultaneously. If the orientations of the first panoramic image and the corresponding panoramic image are unknown or incorrect, the view of the panoramic images may be different. As such, the computing device may display an alignment line to assist the user in aligning the heading of the corresponding panoramic image to the first panoramic image. For example, as shown in FIG. 8, the selected corresponding panoramic image 610 may be presented above first panoramic image 300. An alignment line 810 may be overlaid on top of both images. Instructions 820 may be displayed that inform the user to align the images by rotating the top panoramic image until both panoramic images are displayed from the same orientation (i.e., heading). For instance, the user may rotate image 610 until the tree is viewed in both images from the same direction.

Figure 9:
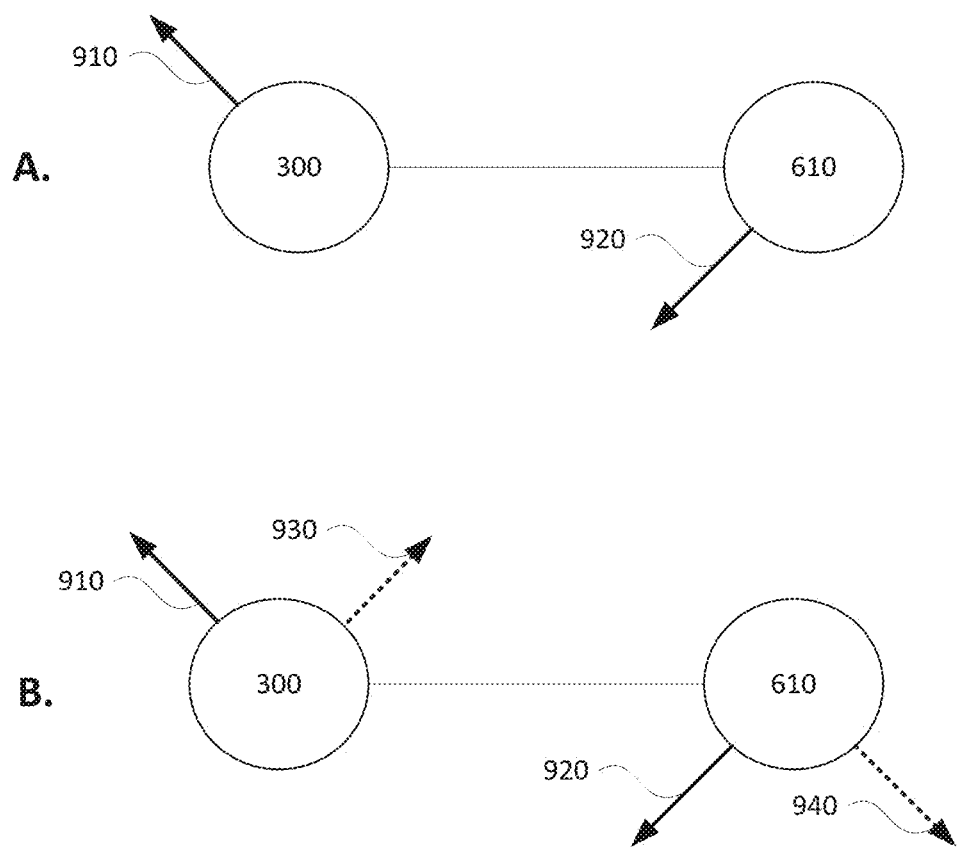
FIG. 9 is an illustration showing the creation of relative orientations in accordance with aspects of the disclosure.

Using the headings of the respective images and their respective location data, the relative orientation information for both the first panoramic image 300 and the corresponding panoramic image 610 may be found. In this regard, the relative orientations between the panoramic images 300 and 610 may be determined. For example, as shown in drawing A of FIG. 9, each panoramic image 300 and 610 has an unknown true north vector 910 and 920. The relative orientation for first panoramic image 300, labeled as 930 in drawing B of FIG. 9, may be defined by the direction to reach the corresponding panoramic image 610. The relative orientation of the corresponding panoramic image 610, labeled as 940 may be defined as the direction to reach the first panoramic image 300. The relative orientation of the first panoramic image 300 may be determined by calculating the heading from the first panoramic image 300 to the corresponding panoramic image 610 using the following formula (where $\varphi_1, \lambda_1$ is the lat/long of the first panoramic image and, $\varphi_2, \lambda_2$ is the lat/long of the corresponding panoramic image and $\Delta\lambda$ is the difference in longitude between the first panoramic image and the corresponding panoramic image):

$$\theta = a\tan 2(\sin \Delta\lambda \cdot \cos \varphi_2, \cos \varphi_1 \cdot \sin \varphi_2 - \sin \varphi_1 \cdot \cos \varphi_2 \cdot \cos \Delta\lambda) \qquad A.$$

The relative orientation of the corresponding panoramic image 610 may then be determined by setting the orientation of the corresponding image in the direction of the first panoramic image. For example, as shown in drawing A of FIG. 10, the computing device may set the relative orientation 930 (i.e., θ) of first panoramic image 300 and the relative orientation 940 of corresponding panoramic image 610 towards each other. The relative orientation of the corresponding image may then be calculated by subtracting 180° from the relative orientation θ of the first panoramic image 300. As such, the true north for the first panoramic image 910 and true north for the corresponding panoramic image 920 may be oriented in the same direction.

The true north vector may then be determined based on the location data and relative orientations for both the first panoramic image 300 and the corresponding panoramic image 610. In this regard the true north vector may be calculated by determining the heading of the first panoramic image and corresponding panoramic image at 0°. Additionally, any other vector direction, relative to the relative orientations of the panoramic images, may be determined using the same technique.

Figure 10:
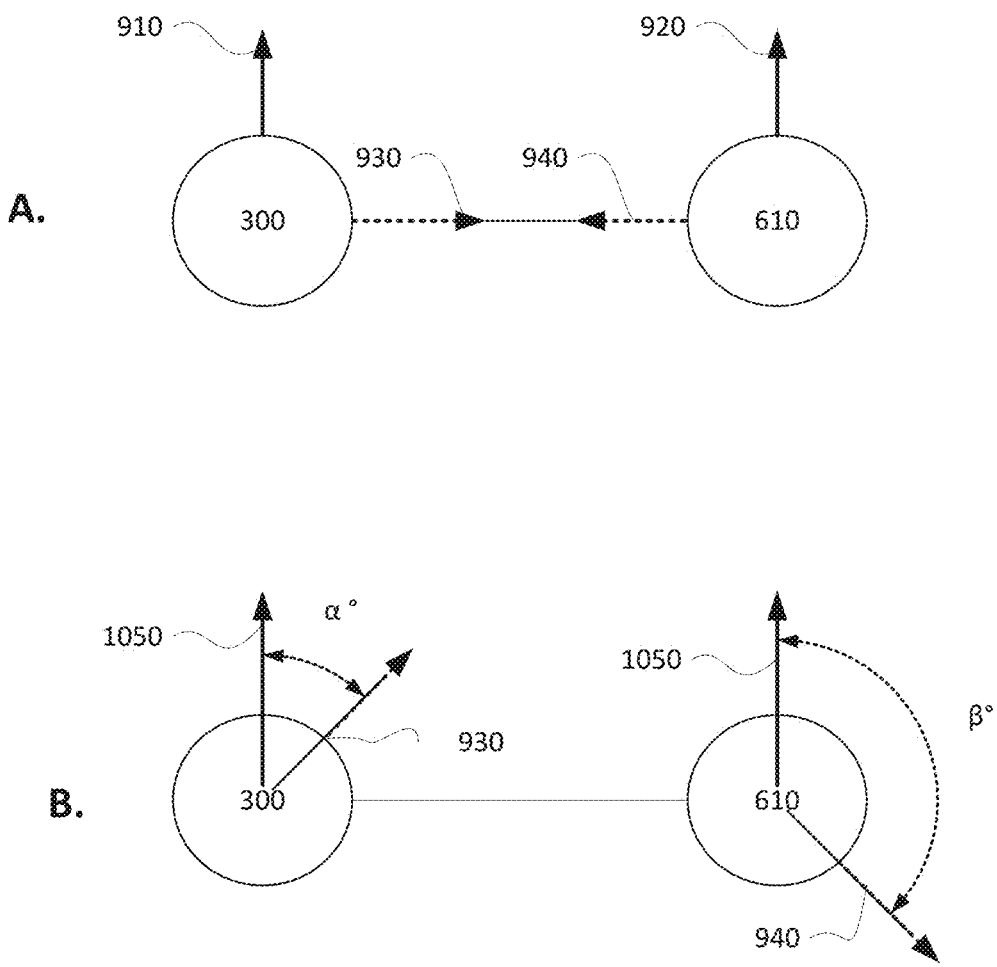
FIG. 10 is an illustration showing the creation of relative orientations in accordance with aspects of the disclosure.

The relative orientation between the two panoramic images may then be calculated as an angular distance from a common vector. For example, as shown in drawing B of FIG. 10, the angular difference between the relative orientation of the first panoramic image 930 may be calculated from a vector, such as vector 1050. Similarly, the angular difference between the relative orientation of the corresponding panoramic image 940 may be calculated from the same vector 1050. The location of the two panoramic images 300 and 610 may be the location provided by the location data, and their respective relative orientations may be defined, as shown in FIG. 10, as angle α° for the first panoramic image and angle β° for the second panoramic image.

Figure 11:
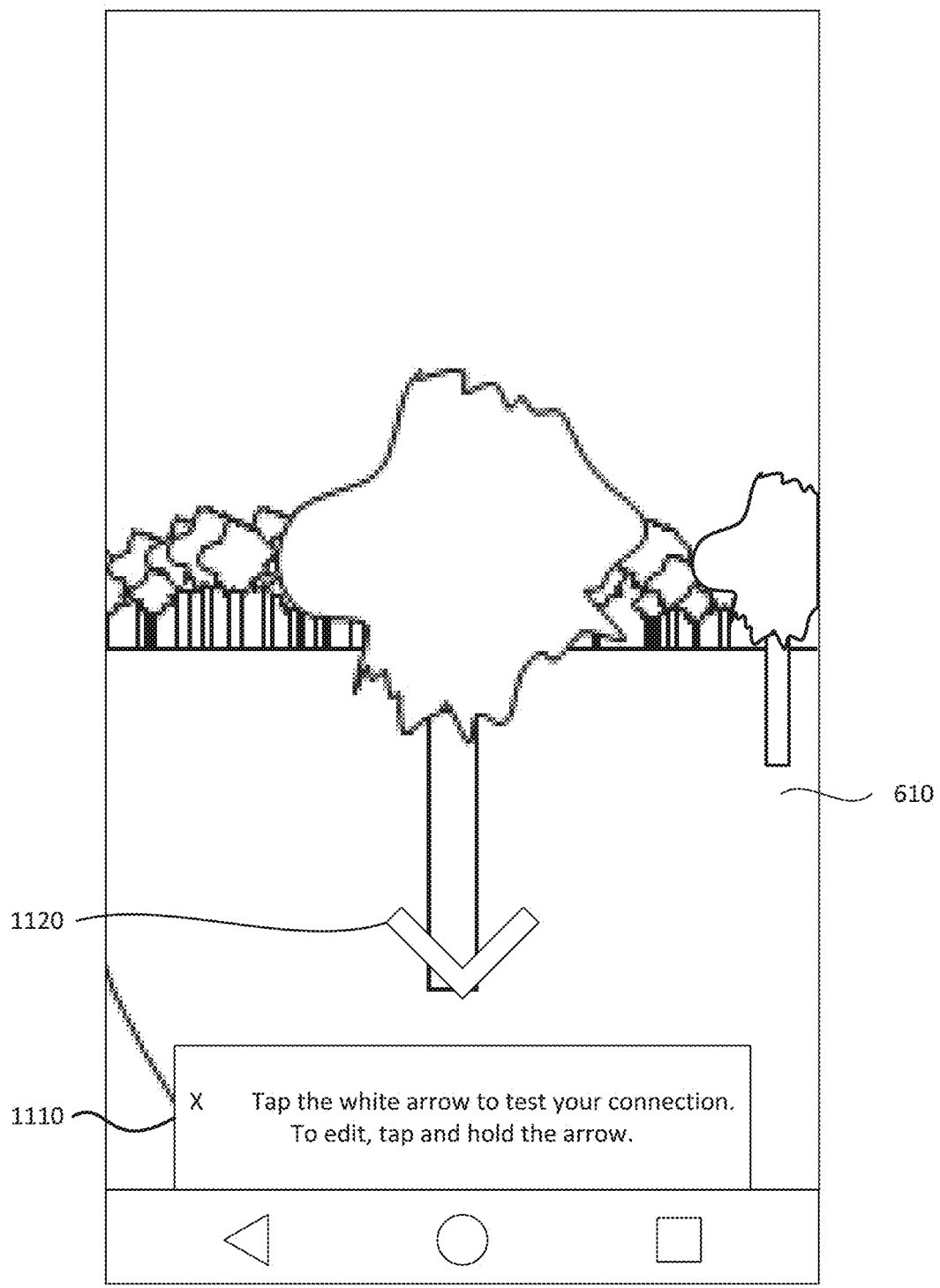
FIG. 11 is an example screenshot of a finalization interface in accordance with aspects of the disclosure.

Upon determining the orientation and location data, the connection between the first panoramic image and the corresponding panoramic image may be completed. As shown in FIG. 11, a testing screen may be presented to the user, to allow them to test the created connection. The testing screen may display the corresponding panoramic image 610 along with instructions 1110 and a navigation point 1120. As explained by the instructions 1110, the user may select the navigation point 1120 to view the transition from the corresponding panoramic image 610 to the first panoramic image 300. Upon the user accepting the created connection, the created connection may be stored in the memory or storage device. In some embodiments, the orientation and location data may be optimized, as described below, prior to creating the connection.

In the event other panoramic pairs have been created with one or both of the first panoramic image or corresponding panoramic image, the locations of all of the panoramic images in the panoramic pairs, as well as their relative orientations and headings may be further optimized. Since the location data and relative orientations of the two panoramic images may be inaccurate, such as from human error or imprecise GPS data the transition from the first panoramic image to the corresponding panoramic image may still be inconsistent, and such inconsistencies may be compounded as additional panoramic images are paired with one or more of the two panoramic images.

As such, the computing device may calculate new values for all panoramic images to assure a consistent experience for all panoramic pairings while maintaining particular objectives. The objectives may include: (1) Assuring new locations for panoramic images are as close as possible to the original GPS locations; (2) The orientations of the panoramic images are such that the directions defined by relative angles between the pairs of panoramic images point towards each other i.e., for a given pair of panoramic images A and B, if the new orientations are azimuth_A and azimuth_B then (azimuth_A+relative_angle_A) and (azimuth_B+relative_angle_B) should be 180 degrees apart; and (3) Assuring the distances between pairs of panoramic images are as close to the original distances as possible.

The objectives may be addressed as costs to an objective function that is then minimized using a least squares solver. For example, given pair of panoramic images A and B, let the original locations be (latitude_A_original, longitude_A_original) and (latitude_B_original, longitude_B_original), respectively. Additionally, let their original orientations be azimuth_A and azimuth_B, respectively. Further, for given pair of panoramic images A and B, let updated locations be (latitude_A_new, longitude_A_new) and (latitude_B_new, longitude_B_new), respectively. Then the GPS cost for moving a panoramic image of the panoramic pair (A, B) can be defined as follows:

GPS_cost(A)=distance((latitude_A_original, longitude_A_original),(latitude_A_new, longitude_A_new))   A.

GPS_cost(B)=distance((latitude_B_original, longitude_B_original),(latitude_B_new, longitude_B_new))   B.

In addition, the orientation cost for the panoramic pair (A, B) can be defined as follows, where AngleDifference is the difference between the two angles including wraparound (e.g, (0, 10)=10 and (0, −10)=−10), HeadingBetween is the heading on the map between the two locations of the panoramic images, and the constraint_angle is given by the user, with the azimuth/true north of the panoramic image offset into it to align with north.

orientation_cost(A,B)=AngleDifference[HeadingBetween(latitude_A_new,longitude_A_new),(latitude_B_new,longitude_B_new)),constraint_angle_A_B]   A.

orientation_cost(B,A)=AngleDifference[HeadingBetween(latitude_B_new,longitude_B_new),(latitude_A_new,longitude_A_new)),constraint_angle_B_A]   B.

The distance cost for the panoramic pair (A, B) can be defined as follows:

distance_cost(A,B)=distance((latitude_A_original, longitude_A_original),(latitude_B_original,longitude_B_original))−distance((latitude_A_new, longitude_A_new),latitude_B_new, longitude_B_new))   A.

The total cost is then the sum of all the GPS costs and all the orientation costs. By performing a least squares analysis on the above orientation costs, the least squares solution may result in the determination of new location and orientations for both panoramic images. As such, the above objectives may be satisfied by minimizing the costs to the above objective functions for each panoramic image pair.

Figure 12:
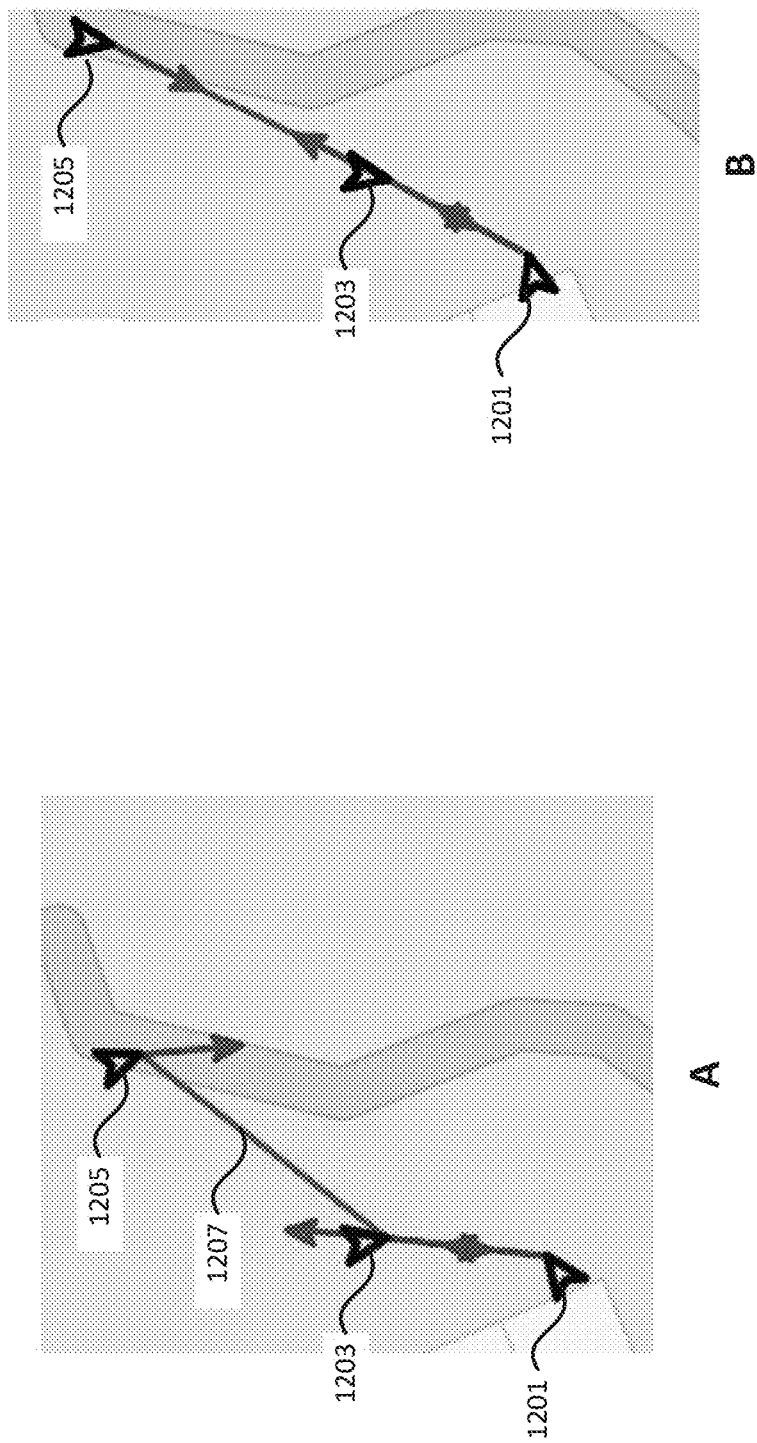

For example, as shown in FIGS. 12*a*, 13*a*, and 14*a*, respective panoramic images 1201-1205, 1301-1305, and 1401-1405 may be paired together. The relative orientations of the respective panoramic images, as shown by the arrowed lines, may not align with the heading between the paired panoramic images. For example, in FIG. 12*a*, the relative orientations between panoramic image 1203 and 1205 may be off of the heading 1207 between the panoramic images. In FIG. 13*a* the relative orientations between panoramic image 1303 and 1301 may be off of the heading 1302 between the panoramic images. In FIG. 14a the relative orientations between panoramic image 1401 and 1403 may be off of the heading 1402 and the orientation between panoramic image 1401 and 1403 may be off of the heading 1403. Additionally, panoramic image 1403 may be paired with panoramic image 1405, and the relative orientations between the images may be off of the heading 1406.

Accordingly, the locations and orientation of the panoramic images 1201-1205, 1301-1305, and 1401-1405 may be optimized. In this regard, for each panoramic pair, the objectives may be satisfied by minimizing the costs to an objective function by solving for the minimum value and selecting the values which result in the lowest total cost.

In some embodiments a connection between panoramic images may be removed. For example, a user may long press or double click on a navigation icon, such as navigation icon 410 of FIG. 4. The application may then ask if the user wishes to remove the connection point.

Figure 15:
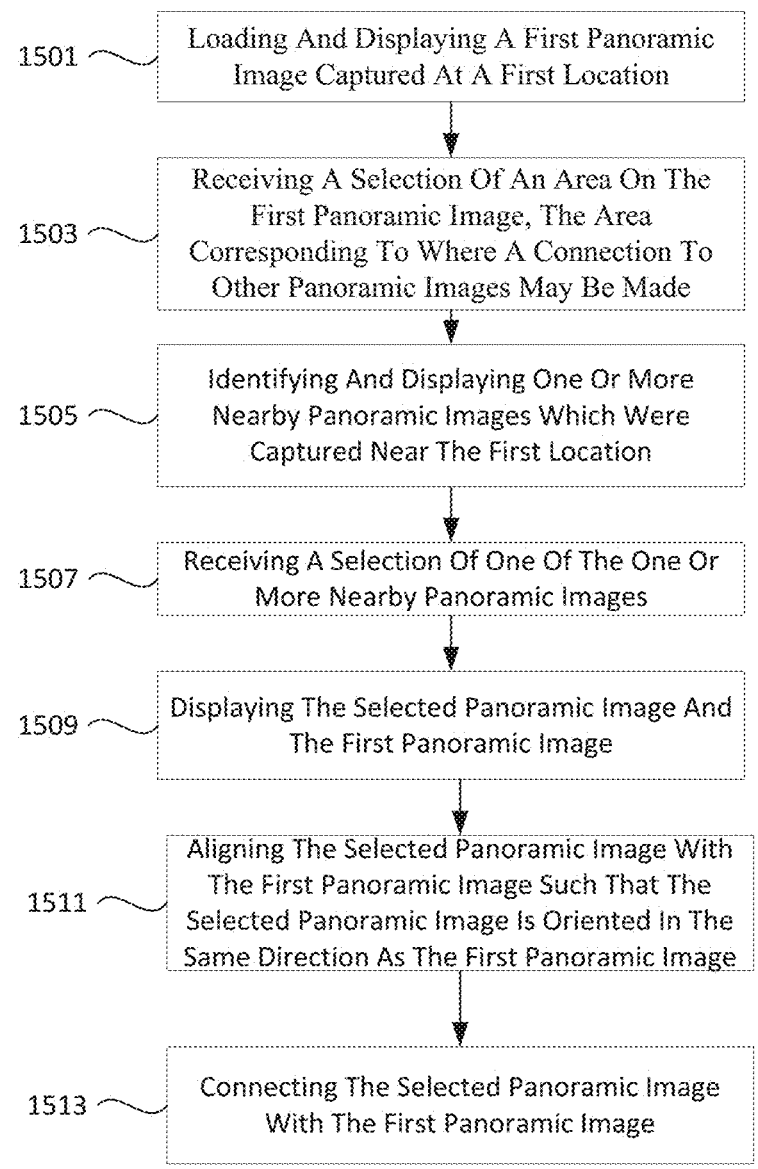
FIG. 15 is a flow diagram in accordance with an embodiment.

Flow diagram 1500 of FIG. 15 is an example flow diagram of some of the aspects described above that may be performed by one or more computing devices such as client computing devices 120 or 130. It will be understood that the steps discussed herein are merely an example; the steps may occur in a different order, steps may be added, and steps may be omitted. In this example, at block 1501, one or more computing devices may load and display a first panoramic image captured at a first location. A selection of an area on the first panoramic image, the area corresponding to where a connection to other panoramic images may be made and received by the one or more computing devices, as shown in block 1503. The one or more computing devices may identify and display one or more nearby panoramic images which were captured near the first location as shown in block 1505 and receive a selection of one of the one or more nearby panoramic images, as shown in block 1509. Block 1511 shows the one or more computing devices may display the selected panoramic image and the first panoramic image and block 1513 shows the computing devices may align the selected panoramic image with the first panoramic image such that the selected panoramic image is oriented in the same direction as the first panoramic image, and attach the selected panoramic image with the first panoramic image.

Figure 16:
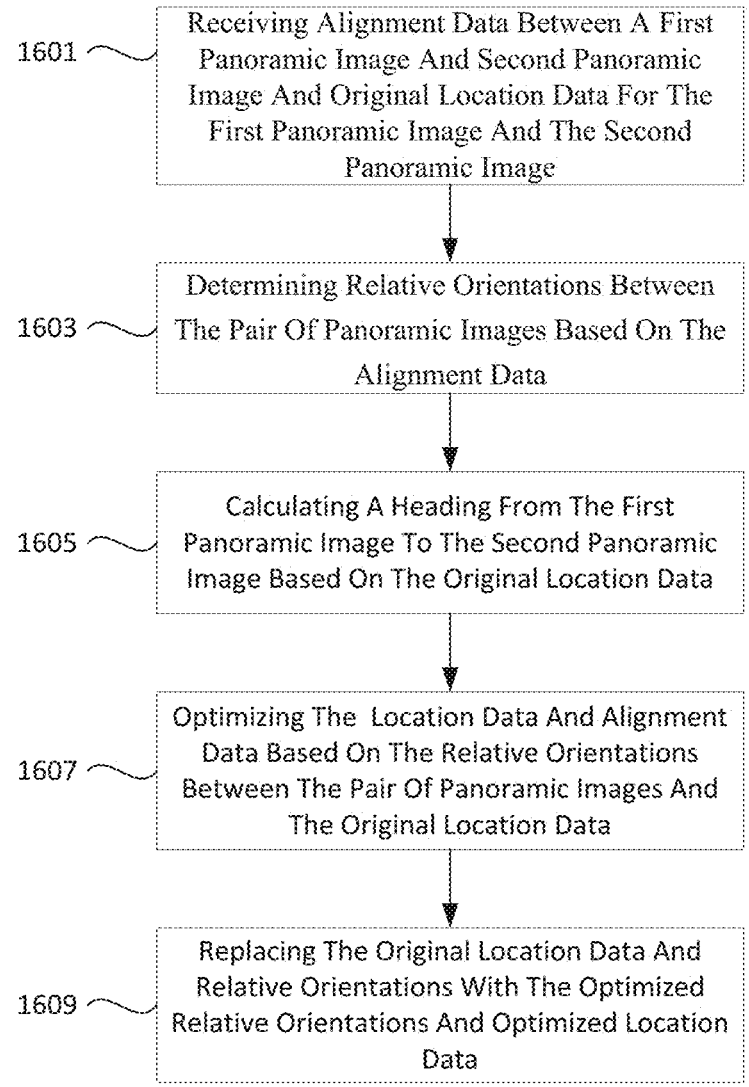
FIG. 16 is a flow diagram in accordance with an embodiment.

Flow diagram 1600 of FIG. 16 is an example flow diagram of some of the aspects described above that may be performed by one or more computing devices such as client computing devices 120 or 130. It will be understood that the steps discussed herein are merely an example; the steps may occur in a different order, steps may be added, and steps may be omitted. In this example, at block 1601, one or more computing devices may receive alignment data between a first panoramic image and second panoramic image and original location data for the first panoramic image and the second panoramic image and, as shown in block 1603, determine relative orientations between the pair of panoramic images based on the alignment data. As shown in block 1605 the one or more computing devices may calculate a heading from the first panoramic image to the second panoramic image based on the original location data, and, as shown in block 1607, optimize the location data and alignment data based on the relative orientations between the pair of panoramic images and the original location data. The one or more computing devices may replace the original location data and relative orientations with the optimized relative orientations and optimized location data, as shown in block 1607.

In this specification, reference to GPS will be understood to relate to location, as may be determined using GPS, Galileo, GLONASS or other satellite positioning system or by using an indoor positioning or other ground-based location-determining system, whether the location determination is performed by the portable terminal or by the supporting infrastructure.

Most of the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. As an example, the preceding operations do not have to be performed in the precise order described above. Rather, various steps can be handled in a different order, such as reversed, or simultaneously. Steps can also be omitted unless otherwise stated. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A computer implemented method for determining the location and orientation of panoramic images:

receiving, by one or more computing devices, alignment data between a pair of panoramic images including a first panoramic image and second panoramic image, and original location data for the pair of panoramic images, wherein the original location data includes geographic location data including latitude and longitude coordinates corresponding to where the first panoramic image and the second panoramic image were captured;

calculating, by the one or more computing devices, a heading from the first panoramic image to the second panoramic image based on the original location data;

determining, by the one or more computing devices, relative orientations between the pair of panoramic images based on the alignment data and the heading;

optimizing, by the one or more computing devices, the original location data and the alignment data based on the relative orientations between the pair of panoramic images and the original location data, wherein optimizing includes calculating optimized relative orientations and optimized location data by minimizing costs for a location objective function and an orientation objective function;

replacing, by the one or more computing devices, the original location data and relative orientations with the optimized relative orientations and optimized location data.

2. The method of claim 1, wherein the alignment data is received from a user.

3. The method of claim 1, wherein the relative orientations between the pair of panoramic images includes:

the direction along which the first panoramic image reaches the second panoramic image; and the direction along which the second panoramic image reaches the first panoramic image.

4. The method of claim 1, comprising the computing apparatus performing calculating the heading, $\theta$, where $\theta = a\tan 2(\sin \Delta\lambda \cdot \cos \varphi_2, \cos \varphi_1 \cdot \sin \varphi_2 - \sin \varphi_1 \cdot \cos \varphi_2 \cdot \cos \Delta\lambda)$, and where $\varphi_1, \lambda_1$ is the latitude and longitude, respectively, of the first panoramic image and, $\varphi_2,\lambda_2$ is the latitude and longitude of the second panoramic image, and $\Delta\lambda$ is the difference in longitude between the first panoramic image and the second panoramic image.

5. The method of claim 1, wherein optimizing further includes calculating optimized relative orientations and optimized location data by minimizing costs for a distance objective function, wherein minimizing the cost for the distance objective function includes minimizing the difference of the distance between the optimized locations for the first and second panoramic images and the distance between the original locations of the first and second panoramic images.

6. The method of claim 1, wherein the costs to the one or more objective functions are minimized by solving for the minimum value using a least squares solver.

7. The method of claim 1, wherein minimizing the cost for the location objective function includes minimizing the movement of the optimized locations for the first and second panoramic images from the original locations of the first and second panoramic images, and
wherein minimizing the cost for the orientation objective function includes maintaining the optimized relative orientations at 180 degrees apart.

8. A system for determining the location and orientation of panoramic images, the system comprising:
one or more computing devices having one or more processors coupled to memory, the one or more processors being configured to:
receive alignment data between a pair of panoramic images including a first panoramic image and second panoramic image, and original location data for the pair of panoramic images, wherein the original location data includes geographic location data including latitude and longitude coordinates corresponding to where the first panoramic image and the second panoramic image were captured;
calculate a heading from the first panoramic image to the second panoramic image based on the original location data;
determine relative orientations between the pair of panoramic images based on the alignment data and the heading;
optimize the location data and the alignment data based on the relative orientations between the pair of panoramic images and the original location data, wherein optimizing includes calculating optimized relative orientations and optimized location data by minimizing costs for a location objective function and an orientation objective function; and
replace the original location data and relative orientations with the optimized relative orientations and optimized location data.

9. The system of claim 8, wherein the alignment data is received from a user.

10. The system of claim 8, wherein the relative orientations between the pair of panoramic images includes:
the direction along which the first panoramic image reaches the second panoramic image; and
the direction along which the second panoramic image reaches the first panoramic image.

11. The system of claim 8, wherein the one or more processors are further configured to calculate the heading, $\theta$, where $\theta = a\tan 2(\sin \Delta\lambda \cdot \cos \varphi_2, \cos \varphi_1 \cdot \sin \varphi_2 - \sin \varphi_1 \cdot \cos \varphi_2 \cdot \cos \Delta\lambda)$, and where $\varphi_1,\lambda_1$ is the latitude and longitude, respectively, of the first panoramic image and, $\varphi_2,\lambda_2$ is the latitude and longitude of the second panoramic image, and $\Delta\lambda$ is the difference in longitude between the first panoramic image and the second panoramic image.

12. The system of claim 8, wherein the optimizing further includes calculating optimized relative orientations and optimized location data by minimizing costs for a distance objective function, wherein minimizing the cost for the distance objective function includes minimizing the difference of the distance between the optimized locations for the first and second panoramic images and the distance between the original locations of the first and second panoramic images.

13. The system of claim 8, wherein the costs to the one or more objective functions are minimized by solving for the minimum value using a least squares solver.

14. The system of claim 8, wherein minimizing the cost for the location objective function includes minimizing the movement of the optimized locations for the first and second panoramic images from the original locations of the first and second panoramic images, and
wherein minimizing the cost for the orientation objective function includes maintaining the optimized relative orientations at 180 degrees apart.

15. A non-transitory computer-readable medium storing instructions, which when executed by one or more processors, cause the one or more processors to:
receive alignment data between a pair of panoramic images including a first panoramic image and second panoramic image and original location data for the pair of panoramic images, wherein the original location data includes geographic location data including latitude and longitude coordinates corresponding to where the first panoramic image and the second panoramic image were captured;
calculate a heading from the first panoramic image to the second panoramic image based on the original location data;
determine relative orientations between the pair of panoramic images based on the alignment data and the heading;
optimize the original location data and the alignment data based on the relative orientations between the pair of panoramic images and the original location data, wherein optimizing includes calculating optimized relative orientations and optimized location data by minimizing costs for a location objective function and an orientation objective function; and
replace the original location data and relative orientations with the optimized relative orientations and optimized location data.

16. The non-transitory computer-readable medium of claim 15, wherein the alignment data is received from a user.

17. The non-transitory computer-readable medium of claim 15, wherein the relative orientations between the pair of panoramic images includes:
the direction along which the first panoramic image reaches the second panoramic image; and
the direction along which the second panoramic image reaches the first panoramic image.

18. The non-transitory computer-readable medium of claim 15, wherein the instructions further cause the one or more processors to calculate the heading, $\theta$, where $\theta = a\tan 2(\sin \Delta \cdot \cos \varphi_2, \cos \varphi_1 \cdot \sin \varphi_2 - \sin \varphi_1 \cdot \cos \varphi_2 \cdot \cos \Delta\lambda)$, and where $\varphi_1,\lambda_1$ is the latitude and longitude, respectively, of the first panoramic image and, $\varphi_2,\lambda_2$ is the latitude and longitude of the second panoramic image, and $\Lambda$ is the difference in longitude between the first panoramic image and the second panoramic image.

19. The non-transitory computer-readable medium of claim 15, wherein the optimizing further includes calculating optimized relative orientations and optimized location data by minimizing costs for a distance objective function, wherein minimizing the cost for the distance objective function includes minimizing the difference of the distance between the optimized locations for the first and second panoramic images and the distance between the original locations of the first and second panoramic images.

20. The non-transitory computer-readable medium of claim 19, wherein minimizing the cost for the location objective function includes minimizing the movement of the optimized locations for the first and second panoramic images from the original locations of the first and second panoramic images, and wherein minimizing the cost for the orientation objective function includes maintaining the optimized relative orientations at 180 degrees apart.

\* \* \* \* \*